United States Patent [19]
Ulrich et al.

[11] Patent Number: 6,159,570
[45] Date of Patent: *Dec. 12, 2000

[54] LAMINATED CARD ASSEMBLY

[75] Inventors: Brett Ulrich, South Wales; Blaine Jackson, East Aurora; William Becker, Lockport; Omar Attia, Lakeview; André Saint, Tonawanda, all of N.Y.

[73] Assignee: Avery Dennison Corporation, Pasadena, Calif.

[*] Notice: This patent is subject to a terminal disclaimer.

[21] Appl. No.: 08/882,966

[22] Filed: Jun. 26, 1997

Related U.S. Application Data

[63] Continuation-in-part of application No. 08/327,981, Oct. 24, 1994, Pat. No. 5,662,976.

[51] Int. Cl.[7] .................................................. B65D 65/28
[52] U.S. Cl. ........................... 428/40.1; 40/630; 283/75; 283/109; 428/41.7; 428/41.8; 428/41.9; 428/42.1; 428/42.2; 428/42.3; 428/43; 428/914
[58] Field of Search ................. 428/40.1, 41.7, 428/41.8, 41.9, 42.1, 42.2, 42.3, 43, 914; 283/109.75; 40/630

[56] References Cited

U.S. PATENT DOCUMENTS

| | | | |
|---|---|---|---|
| 4,773,677 | 9/1988 | Plasse | 283/77 |
| 5,058,926 | 10/1991 | Drower | 283/109 |
| 5,096,229 | 3/1992 | Carlson | 283/75 |
| 5,131,686 | 7/1992 | Carlson | 283/75 |
| 5,171,039 | 12/1992 | Dusek | 283/75 |
| 5,172,938 | 12/1992 | Schmidt | 283/109 |
| 5,230,938 | 7/1993 | Hess | 428/41.1 |
| 5,283,093 | 2/1994 | All | 428/40.1 |
| 5,284,689 | 2/1994 | Laurash | 428/41.1 |
| 5,318,326 | 6/1994 | Garrison | 283/101 |
| 5,389,414 | 2/1995 | Popat | 428/40.1 |
| 5,466,013 | 11/1995 | Garrison | 283/107 |
| 5,509,693 | 4/1996 | Kohls | 283/75 |
| 5,518,787 | 5/1996 | Konkol | 428/43 |

*Primary Examiner*—Nasser Ahmad
*Attorney, Agent, or Firm*—Oppenheimer Wolff & Donnelly LLP

[57] ABSTRACT

The present invention relates to an assembly which includes a display card-forming section and an identification card-forming section. The identification card-forming section includes a first backing sheet and contains an identification card backing region. Further included is a first adhesive layer, a first release layer joined to the first side of the backing sheet and to the first adhesive layer except at the identification card backing region where there is an opening in the first release layer, and a transparent lamination sheet. The transparent lamination sheet has a first side, joined to the first adhesive layer. The transparent lamination sheet includes an identification card back covering portion aligned with the opening and an identification card front covering portion adjacent to and substantially similar in size to the identification card back covering portion, where the identification card front and back covering portions are separable from the transparent lamination sheet and joined at a location substantially aligned with a side edge of the identification card backing region. Further, the present invention relates to methods of creating a laminated card.

50 Claims, 6 Drawing Sheets

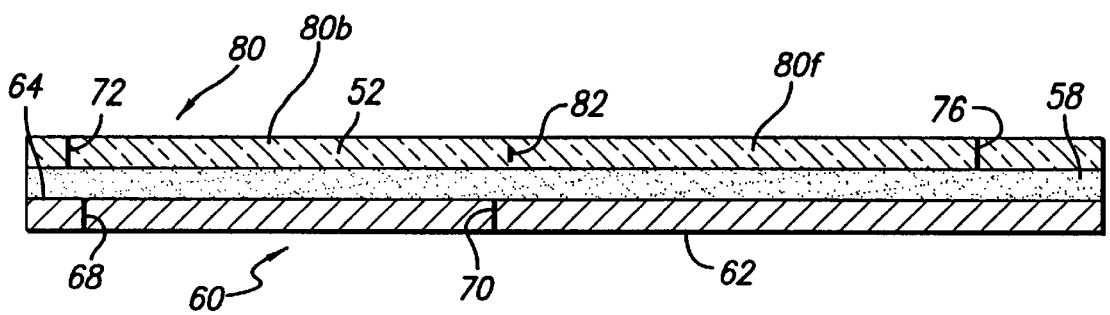
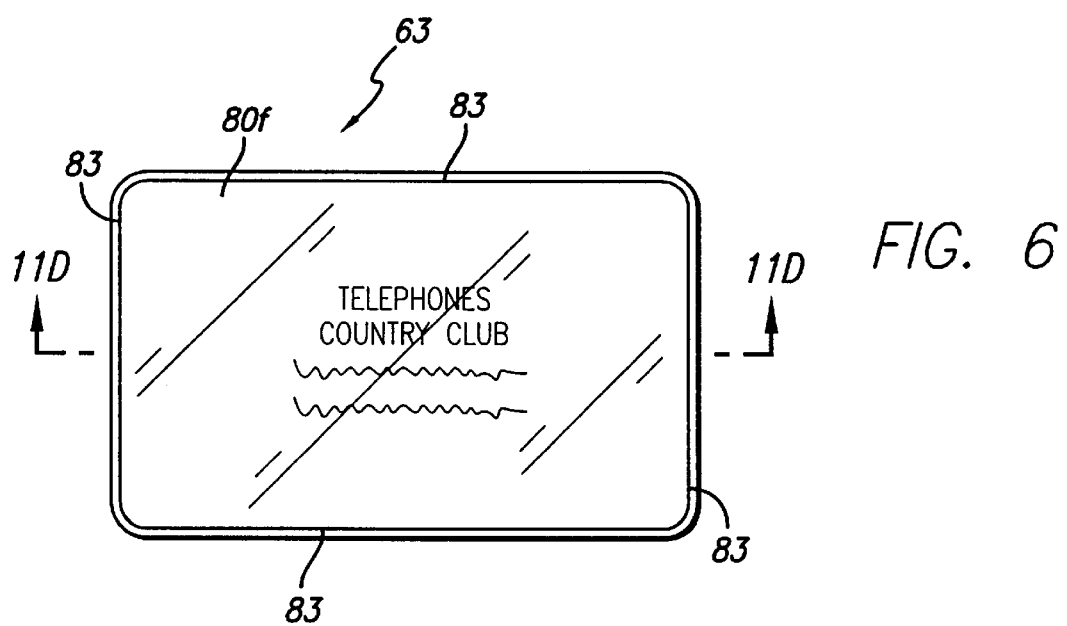
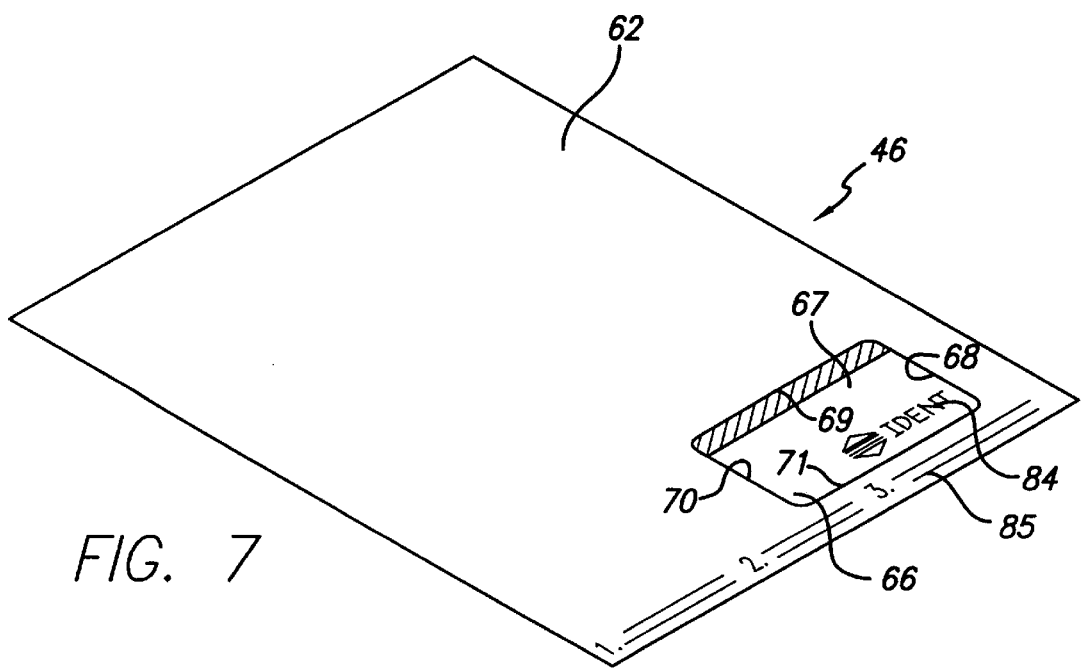

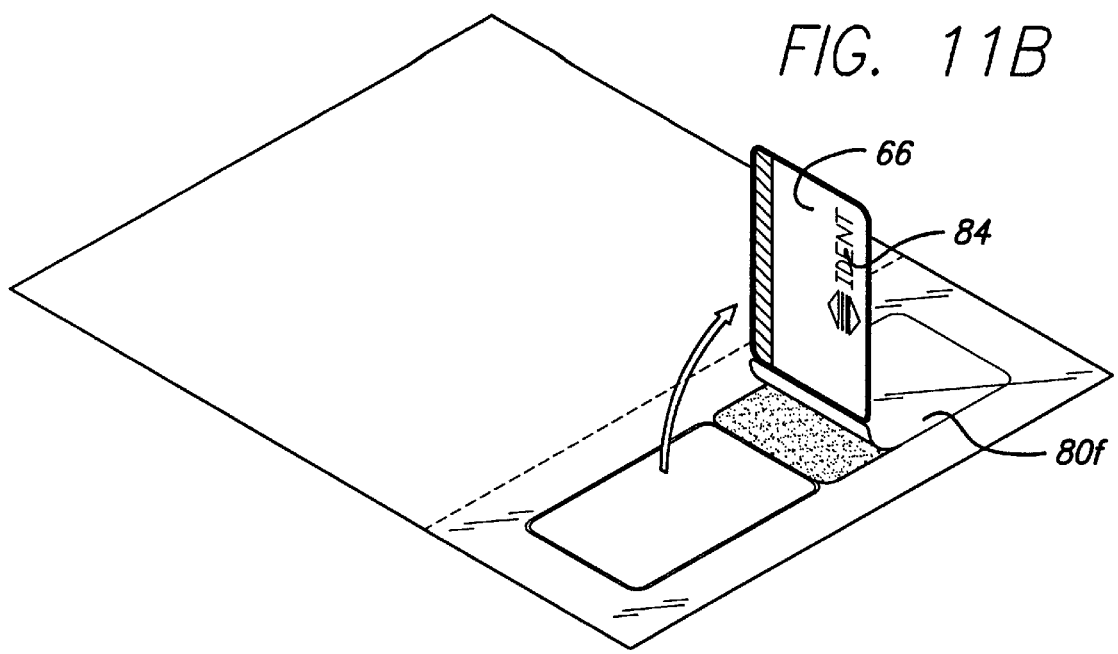
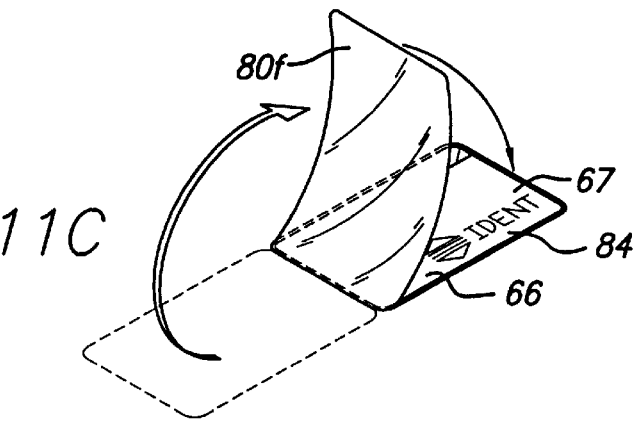
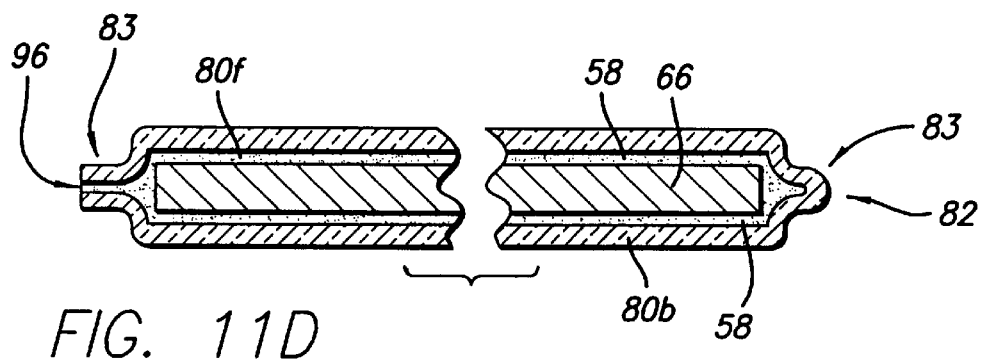

LAMINATED CARD ASSEMBLY

This application is a continuation-in-part of U.S. patent application Ser. No. 08/327,981, filed on Oct. 24, 1994 now U.S. Pat. No. 5,662,976.

FIELD OF THE INVENTION

This invention relates to the field of laminated cards and, in particular, to assemblies for making laminated identification cards.

BACKGROUND OF THE INVENTION

Modern society has found innumerable uses for laminated cards. Perhaps billions of such cards have been made for use as conference name tags, personal identification cards, gift tags, parking passes, playing cards, and so on. Other types of laminated cards include adhesive index tabs and hanging file folder tabs. Indeed, nearly everyone has a laminated card of some sort.

In the not so distant past, simple laminated cards such as club membership cards were made by hand. A secretary would typically insert a card into a typewriter and would type in relevant information such as the member's name and date of admission. After the member had signed the card, the secretary would place the card on a sheet of transparent plastic for forming the lamination assembly. The secretary would then fold the lamination over the card, press the lamination down to seal the card within the lamination, and cut the lamination about the card to remove any excess.

In the 1980's, dot matrix printers came into widespread use. Laminated card assemblies were developed for dot matrix printers to simplify the process of making a laminated card. A typical dot matrix laminated card assembly had tractor feed holes running along either side of the assembly so that it could be fed through the dot matrix printer. A lamination sheet was attached to a card on one side and had a thin backing on the other side. The dot matrix printer would print information on the back of the card, after which the secretary would remove the card from the printer, remove the backing from the lamination, and fold the lamination over the card. The secretary would then cut off the tractor feed holes with scissors, or tear off the strip of holes if perforation lines were provided for that purpose.

FIG. 1 shows a prior art assembly 20 for printing cards in a dot matrix or other type of printer equipped with a tractor feed mechanism. Prior art assembly 20 includes tractor feed strips 22 having tractor feed apertures 24. Tractor feed strips 22 are removable from assembly 20 at lines of perforation 26. The front of the assembly 20 has a layer of lamination 28 which is coated with a pressure sensitive adhesive 30.

FIG. 2 illustrates the back side of the prior art assembly 20 of FIG. 1. FIG. 2 shows a piece of lining material 32 being removed from adhesively backed lamination layer 28. The right hand side of the assembly of FIG. 2 is a card 34 having a printable surface 36. Generally speaking, the assembly is fed through a tractor feed printer, which prints indicia 38 onto printing surface 36. This indicia 38 may include personalized information such as a country club member's name, membership number, and so on. After the assembly has passed through the printer, the user may then sign the card 34, remove liner 32 from lamination layer 28, remove tractor feed strips 22, and fold lamination 28 over at line 40 to cover and adhere to card 34. The user then has a laminated membership card that she or he may carry with him.

In the 1990's, laser printers and ink jet printers replaced dot matrix printers as the printers of choice. Such printers are capable of printing high resolution text and graphics at a high speed with very little noise. Unfortunately, the old tractor feed laminated card assemblies did not work well in laser printers and ink jet printers and photocopiers. There are a number of problems with using the prior art assembly of FIGS. 1 and 2 in a modern day laser printer, ink jet printer, or photocopier. The left hand side 29 of assembly 20 has a thickness that is less than that of right hand side 31. Consequently, there is a sudden thickness change at line 40. This inconsistent thickness will tend to cause jamming in a laser printer, ink jet printer, or photocopier. The friction feed of these types of printers has difficulty grasping hold of such a varying thickness assembly. Additionally, tractor feed apertures 24 will both interfere with the friction feed of these printers as well as provide an opportunity for assembly 20 to become snagged in the interior of the printer. Consequently, the prior art assembly of FIGS. 1 and 2 is inappropriate for use in the types of printers that are most common in offices today.

Thus, there has been a very substantial need to develop an assembly for conveniently printing laminated cards in a laser printer, ink jet printer, photocopier or other printer requiring a substantially flat printing surface.

SUMMARY OF THE INVENTION

It is therefore an object of the present invention to provide an assembly for making laminated cards using a laser printer, ink jet printer or photocopier. It is also an object to provide an assembly having substantially constant thickness and flat upper and lower surfaces so that the assembly will not jam in the complex paper path of laser or ink jet printers, or photographic copiers. It is a further object of the invention to provide an assembly which can yield laminated identification cards.

Accordingly, the present invention relates to a longitudinally extending assembly for creating a display card and a laminated identification card which are suitable for printing on with a laser or ink jet printer, or photocopier. The assembly includes a display card-forming section extending along part of the length of the assembly and an identification card-forming section attached to the display card-forming section and extending along part of the length of the assembly. The identification card-forming section includes a first backing sheet which includes opposed first and second sides and contains an identification card backing region separable from the first backing sheet defined by opposite top and bottom edges joined by opposite side edges within the first backing sheet where the second side is suitable for being printed on. The identification card-forming section further includes a first adhesive layer, a first release layer joined to the first side of the first backing sheet and to the first adhesive layer except at the identification card backing region where there is an opening in the first release layer, and a transparent lamination sheet. The transparent lamination sheet has a first side, joined to the first adhesive layer. The transparent lamination sheet includes an identification card back covering portion aligned with the opening and an identification card front covering portion adjacent to and substantially similar in size to the identification card back covering portion. The identification card front and back covering portions are separable from the transparent lamination sheet and joined at a location substantially aligned with a side edge of the identification card backing region. The laminated identification card is formed by separating the identification card backing region and the identification card front and back covering portions from the assembly, folding the identification card front covering portion over the second side of the identification card backing region, and joining the identification card front covering portion to the identification card backing region with the adhesive layer.

Another aspect of the invention relates to a longitudinally extending assembly having a width and a length for creating laminated cards for printing by a laser printer, ink jet printer, or photocopier. The assembly includes a display card-forming section extending along part of the length of the assembly and an identification card-forming section attached to the display card-forming section and extending along part of the length of the assembly. The identification card-forming section includes a longitudinally extending backing sheet which has a first side and a second side suitable for receiving printing. The backing sheet may also be die cut to provide at least one opening with a card having an extent which completely fills the opening and which is removably positioned in the opening. A lamination sheet is adhesively adhered to a first portion of the first side of the backing sheet. The lamination sheet may also be die cut to provide a removable lamination strip which adheres to and covers one surface of the card and which is also removably adhered to the backing sheet in the area adjacent to the opening. The assembly has a substantially constant thickness across the entire width and length of the assembly to prevent jamming in the laser or ink jet printer.

The backing sheet may have certain areas which have a release coating for convenience in peeling back a portion of the transparent plastic laminating sheet. Alternatively, the backing sheet may be coated across its entire width and length with a release coating. Additionally, the assembly is preferably no more than fifteen mils thick, to prevent jamming in a complex printer sheet feed path. Permanent pressure sensitive adhesive may be employed to secure the cards to and within the lamination. Further, the laminating plastic preferably has an area slightly more than twice that of the card, so that it may cover both sides of the card and seal around the edges thereof.

Another aspect of the invention relates to a method for creating a laminated card from a longitudinally extending assembly. The assembly includes a display card-forming section extending along part of the length of the assembly and an identification card-forming section attached to the display card-forming section and extending along part of the length of the assembly. The identification card-forming section includes a first backing sheet having opposed first and second sides and containing an identification card backing region separable from the first backing sheet. The identification card-forming section is defined by opposite top and bottom edges joined by opposite side edges within the first backing sheet. The second side is suitable for being printed on. This section also includes a first adhesive layer, a first release layer joined to the first side of the first backing sheet and to the first adhesive layer except at the identification card backing region where there is an opening in the first release layer, and a transparent lamination sheet. The transparent lamination sheet has a first side and is joined to the first adhesive layer. The transparent lamination sheet includes an identification card back covering portion aligned with the opening and an identification card front covering portion adjacent to and substantially similar in size to the identification card back covering portion, where the identification card front and back covering portions are separable from the transparent lamination sheet and joined at a location substantially aligned with a side edge of the identification card backing region. The method includes separating the identification card backing region and the identification card front and back covering portions from the assembly, folding the identification card front covering portion over the second side of the identification card backing region, and joining the identification card front covering portion to the identification card backing region with said adhesive layer.

The present invention also encompasses another method for creating a laminated card from an assembly. The assembly has a backing sheet, a card which has been die cut from the backing sheet and which has a printing surface, a lamination sheet adhesively adhered to the backing sheet and to the die cut card, and a lamination strip. The lamination strip has been die cut from the lamination sheet, and it adheres to the card and to the backing sheet adjacent to the die cut card. The backing sheet may have a release coating in at least some of the areas where the lamination adheres to the backing sheet. The assembly may have substantially constant thickness and substantially flat upper and lower surfaces. The method includes removing the card and the lamination strip together from the assembly, with the card being adhered on the side opposite to its printing surface of the lamination strip. The lamination strip may be folded over to cover the printing surface of the card and the lamination strip and the entire card are pressed firmly to seal the lamination strip over the card.

In accordance with various other steps that may be included in the method, the lamination strip may include a line of perforations dividing the lamination member into two symmetrical halves, and the step of folding the lamination strip over may include folding the lamination strip over at the line of perforations. The printing surface of the card is thereby covered by the lamination strip, and the line of perforations assist the user in folding the lamination strip in the proper orientation. A laser printer may perform the step of printing onto the printing surface of the card. The card may have edges, with the lamination strip extending beyond the edges of the card. The step of pressing the lamination strip and the entire card to seal the lamination strip over the card may then include pressing the lamination strip about the edges of the card to seal the lamination strip about the edges of the card.

Other objects, features and advantages will become apparent from a consideration of the following detailed description and from the accompanying drawings.

BRIEF DESCRIPTION OF THE DRAWINGS

FIG. 5 is a cross-sectional view taken about line 5—5 of FIG. 3.

FIG. 6 is a front view of a finished identification card constructed from the assembly of FIG. 3.

FIG. 7 is a back view of an embodiment of the present invention.

FIGS. 11A–D show the formation of an identification card in accordance with the present invention. FIG. 11A is a front view of an embodiment of the present invention, showing the card being partially removed from the assembly. FIG. 11B is a front view of the embodiment of the present invention, showing the card being completely removed from the assembly and the lamination strip being partially removed from the assembly. FIG. 11C shows the card of the present invention removed from the assembly and the lamination layer being folded over the back of the card. FIG. 11D is a cross-sectional view of a finished identification card, taken along line 11D—11D of FIG. 6.

DETAILED DESCRIPTION OF PREFERRED EMBODIMENTS

Figure 1:
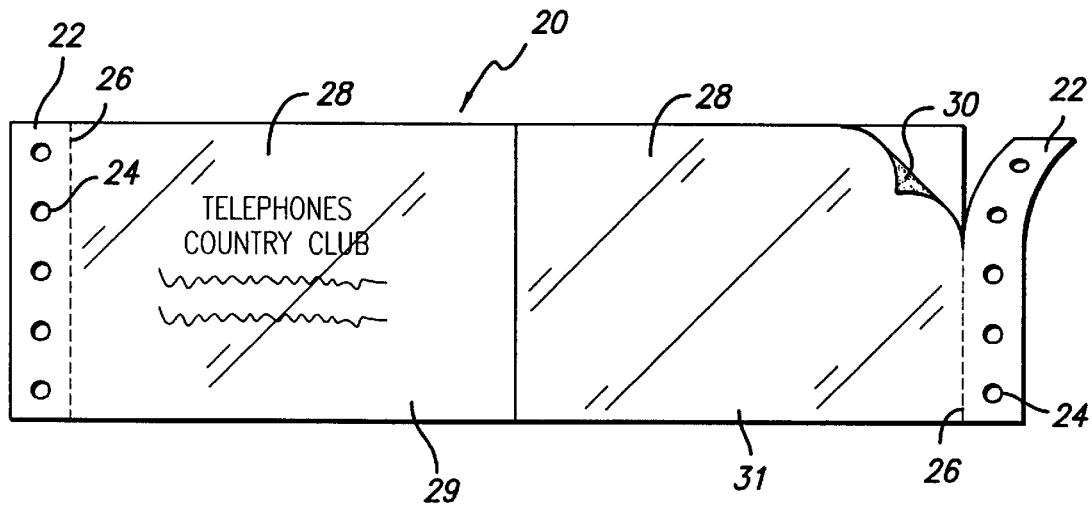
FIG. 1 is a front view of a prior art laminated card assembly for feeding into a printer having a tractor feed apparatus.
Figure 2:
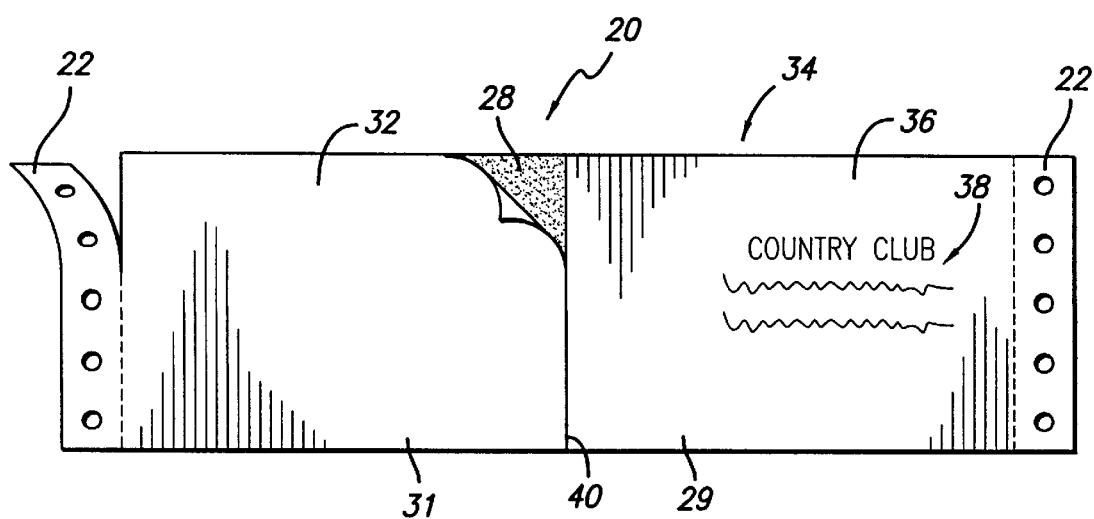
FIG. 2 is a rear view of the prior art assembly of FIG. 1, showing a backing layer partially removed from the front lamination.
Figure 3:
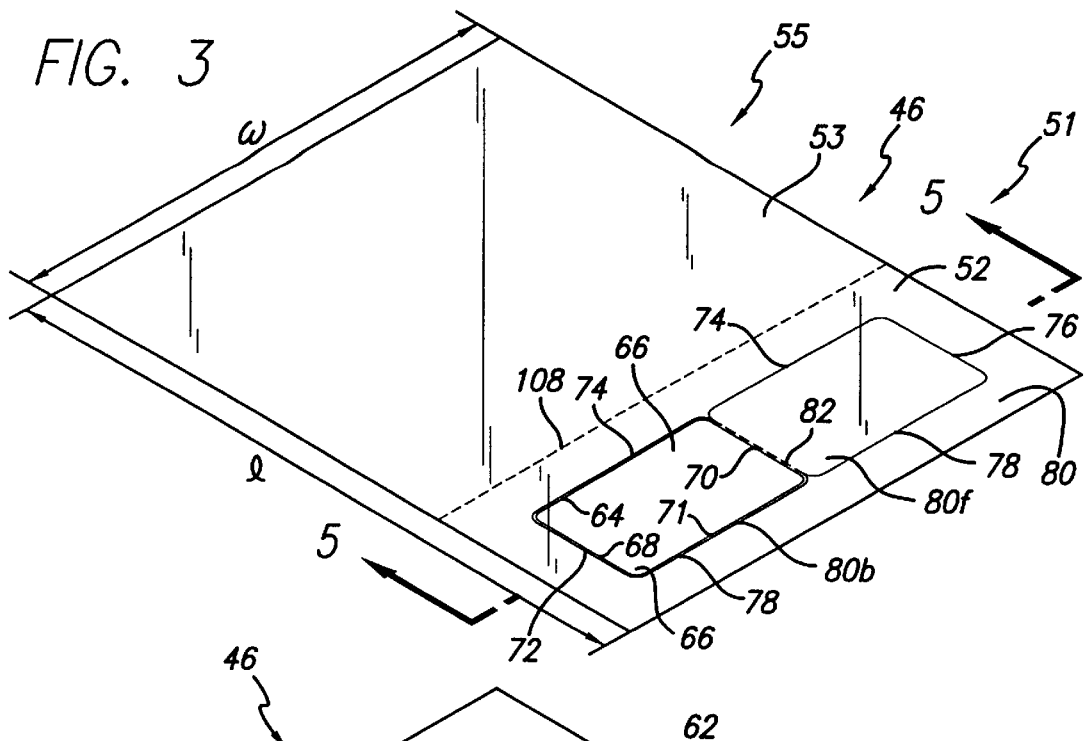
FIG. 3 is a front view of an embodiment of the present invention.
Figure 4:
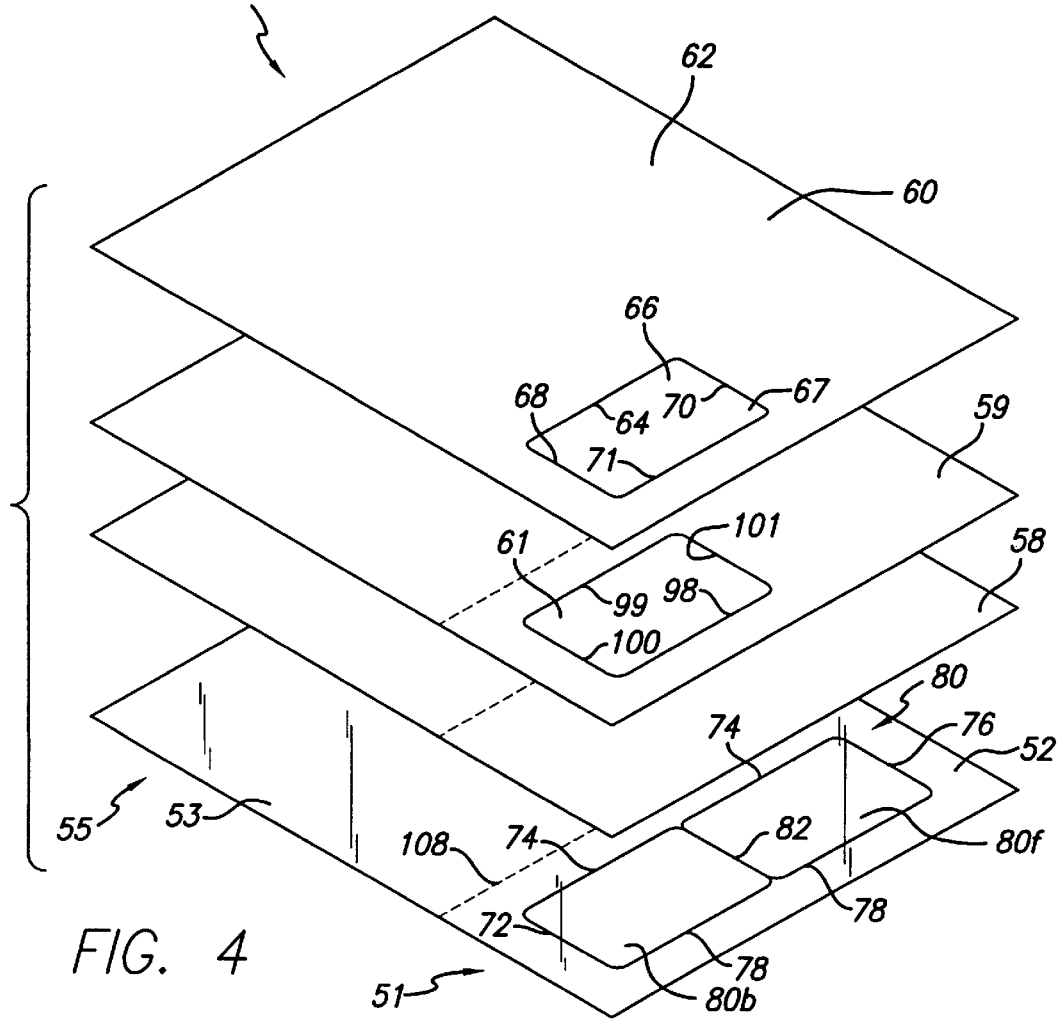
FIG. 4 is an exploded perspective view of an embodiment of the present invention.

Referring more particularly to the Figures, FIG. 3 illustrates a front view of laminated card assembly 46 of the present invention. Assembly 46 extends in a longitudinal direction having a length (l) and a width (w). Assembly 46 includes a display card-forming section 55 and an identification card-forming section 51. Display card-forming section 55 extends along a part of the length (l) of assembly 46. Identification-card forming section 51 is attached to display-card forming section 55 at junction 108 and extends along part of the length (l) of assembly 46. As shown in FIG. 3 and FIG. 4, which is an exploded perspective view of the layers of assembly 46, display card-forming section 55 includes a facing sheet 53. Facing sheet 53 of display card-forming section 55 is aligned with a transparent lamination sheet 52 of identification-card forming section 51 at junction 108. Preferably, junction 108 extends along the entire width (w) of assembly 46. Display-card forming section 55 includes facing sheet 53, adhesive layer 58, release layer 59 and backing sheet 60. Identification-card forming section 51 includes lamination sheet 52, adhesive layer 58, release layer 59, and backing sheet 60.

Preferably, each of lamination sheet 52 and facing sheet 53 has a width which is substantially coextensive with the width of backing sheet 60. Preferably, lamination sheet 52 and facing sheet 53 together have a length which is coextensive with the length of backing sheet 60, where lamination sheet 52 covers a first portion of backing sheet 60 and facing sheet 53 covers a second portion of backing sheet 60. Each of the lengths of lamination sheet 52 and facing sheet 53 can vary, however, the minimum length of lamination sheet 52 is such that approximately the entire extent of identification card backing region 66 is covered by lamination sheet 52, as described below.

Alternatively, the two portions of backing sheet 60 can be made up of two separate sections (not shown). For example, the two sections of backing sheet 60 can be two separate backing sheets. The first section of backing sheet 60 is coextensive with lamination sheet 52, while the second section of backing sheet 60 is coextensive with facing sheet 53. Thus, identification card-forming section 51 and display card forming section 55 have separate sheets making up backing sheet 60 in assembly 46.

Backing sheet 60 which is typically a heavy paper or light cardboard, is die cut at lines 68, 69, 70, and 71 to produce an identification card backing region 66 which is separable from backing sheet 60. Identification card backing region 66 is defined by opposite top and bottom edges, defined by die cuts 69 and 71, which are joined by opposite side edges defined by die cuts 68 and 70. Identification card backing region 66 has a first side (not shown) and a second side 67 opposite the first side suitable for receiving printing.

Lamination sheet 52 is die cut at 72, 74, 76, and 78 to form a lamination strip 80, which normally remains in the same position on lamination sheet 52 from which it was cut. Lamination strip 80 includes a first portion and a second portion. The first portion is an identification card back covering portion 80b and the second portion is an identification card front covering portion 80f. Identification card back covering portion 80b and identification card front covering portion 80f are joined at a location substantially aligned with a side edge 70 of identification card backing region 66. Identification card front covering portion 80f is adjacent to and substantially similar in size to identification card back covering portion 80b. Identification card back covering portion 80b is aligned with identification card backing region 66. Lamination strip 80 is perforated along a center line 82 so that the lamination strip may be easily folded over at perforation line 82 such that identification card front covering portion 80f may be folded over identification card back covering portion 80b. As can be seen in FIG. 3, the portion of lamination strip 80 defined by die cut 72 and line of perforation 82 is somewhat wider than the corresponding identification backing region 66 card defined by die cuts 68 and 70. The portion of lamination strip 80 defined by die cut lines 78 and 74 are also somewhat wider than the corresponding width of identification card backing region 66 defined by die cuts 69 and 71. Consequently, the finished laminated identification card 63 of FIG. 6 will have lamination edges 83 which extend around the card.

It should be noted that die cuts 72, 74, 76, and 78 extend completely through lamination sheet 52, but do not penetrate into backing sheet 60. Likewise, die cut lines 68, 69, 70, and 71 pass through backing sheet 60, but do not extend into lamination sheet 52. Line of perforation 82 passes through lamination sheet 52, but does not extend into the backing sheet 60.

Lamination sheet 52 and facing sheet 53 are coated with an adhesive layer 58. Preferably, adhesive layer 58 extends such that approximately the entire width and length of both facing sheet 53 and lamination sheet 52 are coated with adhesive layer 58. Identification card-forming section 51 and display card-forming section 55 may contain the same adhesive layer or each section may contain separate adhesive layers 58.

Backing sheet 60 has a first surface 64 (not shown) and a second surface for printing 62 on the opposite side of the backing sheet from the first surface 64. The first surface 64 is covered with a release coating layer 59.

Release coating layer 59 may cover the entire width and length of the first surface 64 of backing sheet 60. Alternatively, release layer 59 covers a portion of first surface 64 of backing sheet 60. Preferably, release coating 59 has an opening 61 shown at the rectangular opening defined between lines 98, 99, 100, and 101 where no release coating is contained. Typically, the dimensions of opening 61 is substantially the same as the dimensions of the identification card backing region 66, and opening 61 is coextensive with identification card backing region 66. Further, opening 61 is substantially aligned with identification card back covering portion 80b of lamination strip 80. Identification card-forming section 51 and display card-forming section 55 may contain the same release layer 59 or each section may contain separate layers 59.

FIG. 5 is a cross-sectional view taken along line 5—5 which crosses the width of identification card-forming section 51 of FIG. 3. FIG. 5 shows that assembly 46 includes lamination layer 52, which is coated with a pressure sensitive adhesive layer 58. Backing sheet 60 has a surface for printing 62 and a surface on the opposite side of the backing sheet 64 which has a release coating (not shown).

FIG. 7 illustrates the bottom view of assembly 46 corresponding to the front view in FIG. 3. A die cut identification card backing region 66 is shown defined by die cut lines 68, 69, 70, and 71. As discussed in conjunction with FIGS. 3 and 4, the second side of backing sheet 60 has a printable surface 62 which will receive printing from a laser printer, ink jet printer, or photocopier. Identification card backing region 66 includes indicia 84 on second side 67 of identification card backing region 66 which the printer prints as the assembly passes through the printer. Such indicia may include the name of a particular club member, his or her membership number, and various other information that the user desires. A signature blank may be provided for the member to sign once the card is printed (not shown). The first side (not shown) of identification card backing region 66 may also include various preprinted indicia, which is common to all of a particular type of card. In addition, other information may be printed onto a portion of backing sheet 60 other than identification card backing region 66. For example, indicia 85, such as instructions on the use of the card or on how to assemble the card, may be printed below identification card backing region 66 on the backing sheet 60 as shown. Further, printing may be placed on the printing surface 62 of a portion of backing sheet 60 which corresponds to display card-forming section 53.

In addition, as discussed above, additional information can be printed on printing surface 62 of backing sheet 60. Die cuts as discussed above can be utilized in backing sheet 60 around the printed information to produce, for example, a square or rectangular portion for use as a label. Because the entire portion of backing sheet 60 may be coated with a release coating layer 59, other than at opening 61, the square or rectangular portion defined by the die cuts can be removed from backing sheet 60 of assembly 46 for use as a label.

It should be noted that the assembly 46 has substantially constant thickness and substantially flat upper and lower surfaces so that the assembly can pass through a complex paper path of a laser printer, ink jet printer, or photocopier without jamming. It should also be noted that both the lamination sheet and the backing sheet are substantially aperture- and indentation-free to reduce the possibility of jamming.

Figure 8:
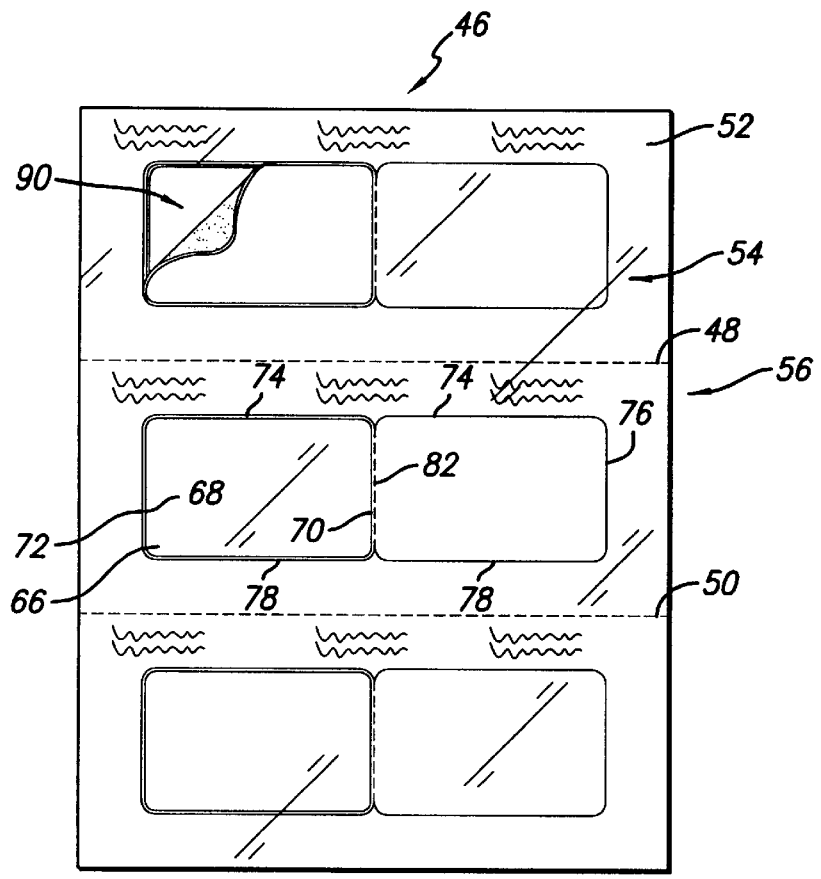
FIG. 8 is a front view of an alternative embodiment of the present invention.
Figure 9:
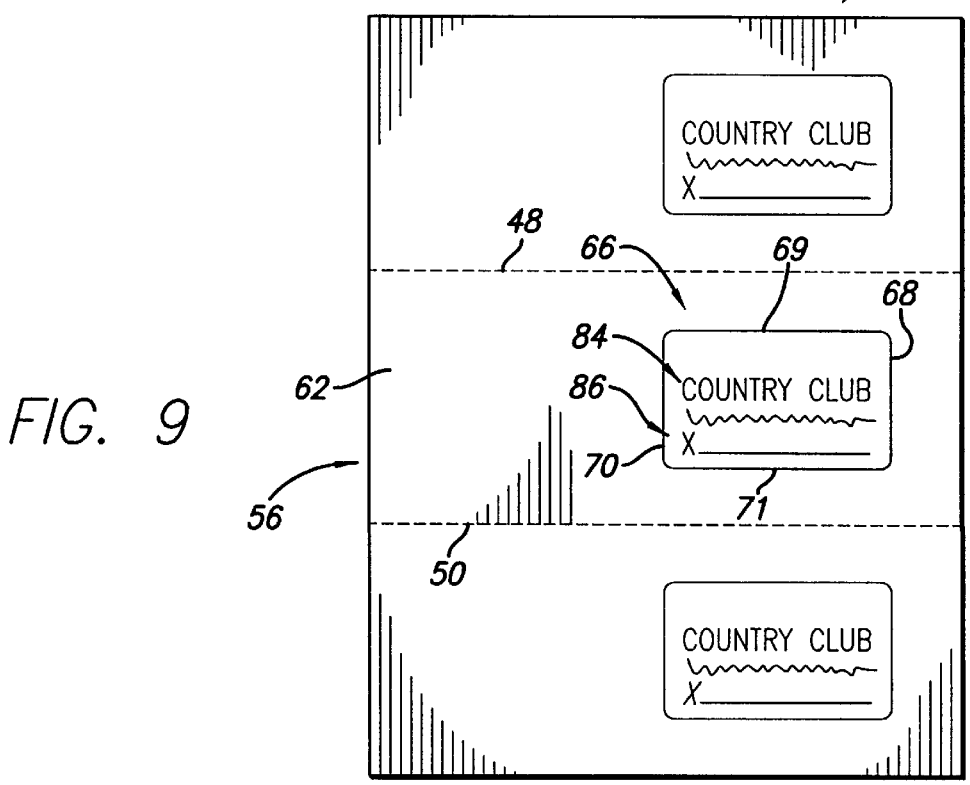
FIG. 9 is the back view of the embodiment shown in FIG. 8.

FIGS. 8 and 9 illustrate an alternative embodiment of a laminated card assembly 46 of the present invention. FIGS. 8 and 9 show that assembly 46 has three separate sections which are separable from one another along transverse lines of microperforations 48 and 50. Assembly 46 includes a top layer having a lamination sheet 52, which is free of apertures or indentations which could interfere with feeding assembly 46 into a laser printer, ink jet printer, or photocopier. Each separable section of the assembly includes an identification card/lamination strip set such as 54.

Figure 10:
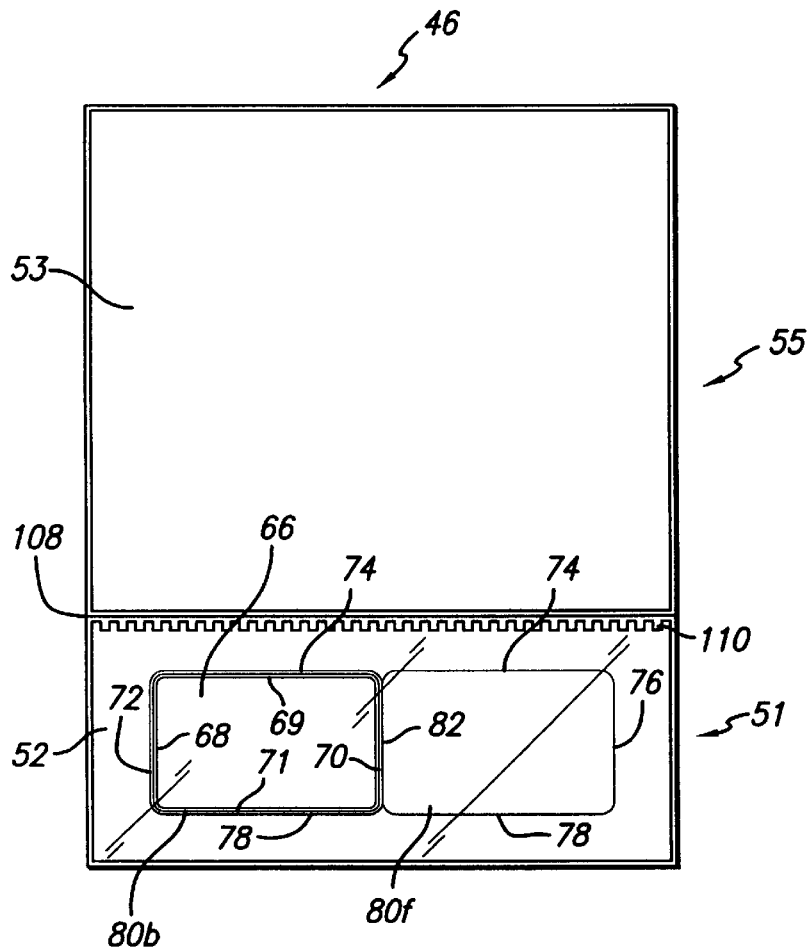
FIG. 10 is a front view of an alternative embodiment of the present invention showing the intermittent placement of adhesive on the assembly.

FIG. 10 shows a front view of the present invention indicating a junction 108 where an edge of lamination sheet 52 and facing sheet 53 meet and, consequently, where display card forming-section 55 and identification card forming-section 51 are attached. Pressure sensitive adhesive layer 58 covers the entire surface of facing sheet 53 and lamination sheet 52 (as shown in FIG. 4). Release layer 59 covers the entire surface of the adhesive layer 58 on facing sheet 53. Further, release layer 59 covers the entire surface of the adhesive layer 59 on lamination sheet 52 except at opening 61 corresponding to indentification card backing region 66 and at a number of voids 110 which contain no release layer 59. Thus, at junction 108, there is intermittent placement of release layer 59 which keeps the edge of lamination sheet 52 firmly attached at junction 108 such that the edge does not lift during laser imaging.

Method of Creating Laminated Cards From Assembly 46

When printing, the user first feeds assembly 46 into the entry paper path of a printer. The printer then carries assembly 46 along its paper path and prints indicia onto the printing surface of the identification card backing region 66. In addition, instructions or other information may be printed onto other sections of backing sheet 60 of assembly 46 as described above. Once the assembly exits the printer, the user removes the identification card backing region from the identification card-forming section 51 of assembly 46 and forms a laminated card 63 in a manner illustrated in FIGS. 11A–D.

Figure 11A:
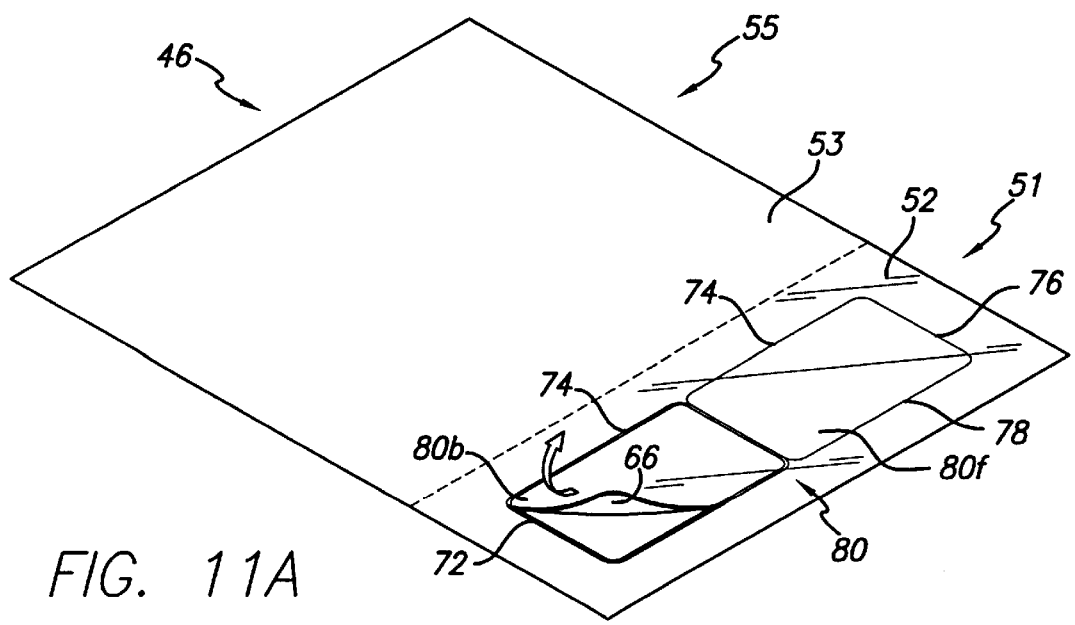

As discussed previously, identification card backing region 66 is adhered on the side opposite to the printing surface 62 of backing sheet 60 to the lamination strip 80. Particularly, identification card back covering portion 80b of lamination strip 80 is adhered to the first side of identification card backing region 66 and identification card front covering portion 80f is removably adhered to backing sheet 60. As shown in FIGS. 11A–D, the user pushes identification card backing region 66 from backing sheet 60. The die cuts present in backing sheet 60 allow identification card backing region 66 to be separated from identification card forming section 51 of backing sheet 60. Identification card front covering portion 80f holds identification card backing region 66 and identification card back covering portion 80b in place. Identification card backing region 66 and lamination strip 80 then are removed from the assembly, as shown in FIG. 11B by removing identification card front covering portion 80f from backing sheet 60. Die cuts present in the lamination sheet 52 defining lamination strip 80 allow identification card front covering portion 80f and identification card back covering portion 80b of lamination strip 80 to be removed from backing sheet 60 of assembly 46.

The user may then fold lamination strip 80 over to cover the printing surface of the card as shown in FIG. 11C. Identification backing covering portion 80b is adhered to the back of identification card backing region 66. Identification card front covering portion 80b is folded over to cover the second surface of identification card backing region 66. If lamination strip 80 includes a line of perforation such as 82, the user may fold the lamination strip 80 over at the line of perforations to cover the printing surface of the card. The user may then press the entire card to seal the lamination strip over the card. The lamination strip may have dimensions greater than those of the card and, in that case, the user may press the entire card to seal the lamination about the edges of the card. It should be noted that after the card has been printed, but before the card has been sealed, the user may also sign his or her name on the card in ink. Alternatively, the user may also attach a photograph or other object onto the printing surface of the card prior to sealing the card.

FIG. 14 is a cross-sectional view of a finished card after the user has sealed it. The finished card includes a first portion which is identification card front covering portion 80f of the lamination strip 80, which covers the second side of the card, and a second portion which is identification card back covering portion 80b of lamination strip 80, which covers the first side of the card. The edges of the lamination 83 which encompass and surround the identification card backing region 66 are of two varieties. The right hand side of FIG. 14 shows an edge along perforated fold line 82. This edge has a continuous piece of lamination which is simply folded over itself. The other three edges of the laminated card, however, consist of first and second portions of the lamination strip 80f, 80b coming together at a junction, such as 96. Pressure sensitive adhesive 58 bonds the lamination to identification card backing region 60, and bonds the first and second portions 92, 94 of lamination layer 52 together about the edges of the card.

Materials From Which the Preferred Embodiment is Constructed

There are five basic material components to the present invention: the lamination layer 52, the facing layer 53, the adhesive layer 58, the release layer 59, and the backing or card layer 60.

The backing sheet itself preferably is paper having a thickness of between 4 and 10 mils, with approximately 6.0 mil being especially desirable. It is noted that the sheets are shown in the drawings thicker than their actual dimensions, the relative thicknesses are not to scale. The backing sheet would usually be formed of fairly heavy paper or light cardboard stock, also known as card stock. The backing sheet may be made from 100 lb. velum card stock, which is available from a wide variety of paper manufacturers and vendors, such as the Simpson Corporation or 80# Litho from Boise Cascade (Boise, Iowa). If desired to include multiple sections, the microperforations consist of cuts which vary in size from 0.0095 to 0.0105 inches and which are separated by ties that vary in size from 0.0045 to 0.0055 inches. Thus, there are between 63 and 69 perforations per inch, with about 66 perforations being an average between the two allowed extremes. More generally, the term "microperforations" indicates that there are more than about 35–40 perforations per inch.

The backing sheet may have a light release coating, such as silicone, to prevent firm adherence of the lamination to the backing layer and to that facilitate peeling the lamination layer off of the backing sheet, as discussed above. The release coating should be extremely thin, in the range of between approximately 0.1 and 0.5 mils. Alternatively, fluorinated or amine-based release coatings, or any other desirable coating may be used.

The lamination sheet is releasably-attached to the backing sheet by a stable, pressure-sensitive adhesive of a type which will not flow at a temperature of a few hundred degrees Fahrenheit. However, it is preferred that the pressure sensitive adhesive will remain stable when subjected to temperatures in the range of up to about 300 to about 400 degrees Fahrenheit to facilitate printing on the cards through laser or other high temperature printing equipment, as discussed above.

The adhesive should be a pressure-sensitive adhesive which does not easily degrade when exposed to ultra-violet light. That is, exposure to ultraviolet light during normal use of the card should not turn the adhesive yellow or cause the adhesive to lose its tackiness. One such adhesive is described in U.S. Pat. No. 5,262,216, which is hereby incorporated by reference. A suitable adhesive is the P60 hot melt adhesive which is available from the Avery Dennison Corporation. Generally speaking, the adhesive should be applied to the lamination layer in a coat of between 0.25 and 2.0 mils thick.

The lamination sheet may be made from any of a number of materials, such as Mylar®, or other suitable transparent sheets which are suitable for laser printing, ink jet printing, or photocopier use. The lamination sheet may have a coating that is receptive to toners and inks so that the finished card may have printing on the surface of the card as well as on the surface of the lamination. Printing on the surface of the lamination would most commonly be by an offset printing process, although it would be possible to print onto the lamination with a laser printer, ink jet printer or photocopiers.

Suitable coated and uncoated Mylar® lamination films are available from DuPont and the Dunmore Corporation. The lamination sheet should be between 1 and 4 mils thick, with 2 mils being especially desirable.

The facing sheet preferably consists of any suitable paper, such as 16 lb. paper, which has a thickness of approximately 2.3 to 2.5 mil.

It should be noted that in selecting the above-mentioned materials, the overall thickness of the assembly should not exceed 15 mils. It has been observed that present day laser printers tend not to work well with assemblies having thicknesses greater than 15 mils. However, if future models of laser printers are developed to be capable of accepting assemblies having a thickness greater than 15 mils, then the maximum overall assembly thickness may be increased.

Additionally, the lamination and backing layer materials may be substantially flat so that the overall assembly has substantially constant thickness throughout its entire width and length, thereby reducing the likelihood that the assembly will jam in the complex paper path of a modern printer. The backing and lamination layers may also be free from apertures, tractor-feed holes, depressions and the like other than die cuts, perforations and other very minor discontinuities.

For purposes of clarity, it should be understood that the term "laser printer" refers not only to laser printers as such, but also to ink jet printers, photocopiers, and any other printer which will jam when a sheet having a non-constant thickness is input into the printer. The present invention is further intended to be used in conjunction with future types of printers not yet developed or not presently in widespread use. It should also be understood that the word "cut" refers not only to die cutting, but also to any other type of cutting, as well as to perforations. It should also be understood that the term "microperforations" is intended to encompass all constructions in which the edges of the backing sheet are smooth and substantially free of coarse irregularities following separation.

Exemplary dimensions of one embodiment are as follows. These dimensions are for purposes of illustration only and not of limitation. A full assembly may be 8½ inches wide by 11 inches long, with a thickness of between approximately 5.35 mils to 15 mils. An individual card may be between 3¼ inches long by 2 inches wide. A lamination strip may be 6¾ inches long and 2⅛ inches wide. The distance from the top of the assembly to the top of the uppermost lamination strip may be 1⅝ inches. The distance from the bottom of the assembly to the bottom of the lower most lamination strip may be ¼ inch. The distance from the left hand edge of the assembly to the left hand edges of the lamination strips may be 7/16 inch. The distance from the right hand edge of the assembly to the right hand edges of the lamination strips may be 1⅜ inches. The lamination strips may be vertically spaced from one another so that the bottom of an upper strip is 1½ inches away from the top of a lower strip.

A wide range of other dimensions are possible. For instance, the overall assembly dimensions may be 3 to 4¼ inches wide by 11 inches long. Alternatively, an 8½ inches wide by 11 inches long assembly may be divided into equal separable sections of 3⅔ inches long each. As discussed previously, each section has one or more card/lamination strip sets. Two lines of microperforations run across the entire width of the assembly to separate the sections. Alternatively, such lines of microperforations could run vertically along the length of the assembly to make vertical separable sections.

Various other dimensions and card shapes are also imaginable. For instance, as new printers are developed that can accommodate very narrow sheets, the present assemblies may be made correspondingly more narrow. Similarly, future printers may accommodate sheets that are more than 8½ inches wide, and the present assemblies may be made wider than 8½ inches within the scope of the invention.

In conclusion, it is to be understood that the foregoing detailed description and the accompanying drawings relate to the presently preferred illustrative embodiments of the invention. However, various changes may be made without departing from the spirit and scope of the invention. Thus, by way of example and not of limitation.

The present invention is not limited to any one application. The present invention encompasses name tags for conferences, gift tags, parking passes, and any other laminated card. After a card has been printed, a user may glue or otherwise attach a photograph to the printing surface of the card. The user can then fold the lamination strip over the card and photograph to create a photo identification card. It is further noted that although fairly heavy paper or card stock is preferred, the term "card" as used herein could refer to normal sheets of paper employed to form laminated assemblies, as disclosed herein.

The present invention also encompasses cards which have shapes other than a standard rectangular card. For instance, the present invention includes an assembly for making laminated cards for rotary address files such as those available from the Rolodex Corporation of Secaucus, N.J. One problem with non-laminated cards for rotary address files is that they easily become dirty and worn. However, the present invention provides a system for creating long-lasting rotary address cards that will not deteriorate with normal use.

The present invention also encompasses other laminated cards, such as custom-designed playing cards which a user designs on a personal computer using clip art images and text. Accordingly, the present invention is not limited to the arrangement shown in the drawings and described hereinabove.

What is claimed:

1. A longitudinally extending assembly for creating a display card and a laminated identification card which are suitable for printing on with a laser or ink jet printer, or photocopier, said assembly comprising:

a display card-forming section extending along part of the length of said assembly;

an identification card-forming section attached to said display card-forming section and extending along part of the length of said assembly, wherein said identification card-forming section comprises:

a first backing sheet comprising opposed first and second sides and containing an identification card backing region separable from said first backing sheet defined by opposite top and bottom edges joined by opposite side edges within said first backing sheet, wherein the second side is suitable for being printed on;

a first adhesive layer;

a first release layer joined to the first side of said first backing sheet and to said first adhesive layer except at the identification card backing region where there is an opening in said first release layer; and a transparent lamination sheet having a first side, joined to said first adhesive layer, wherein said transparent lamination sheet includes an identification card back covering portion aligned with the opening and an identification card front covering portion adjacent to and substantially similar in size to the identification card back covering portion, wherein the back and front covering portions of the transparent lamination sheet have an extent approximately equal to at least twice the extent of said identification card, wherein the identification card front and back covering portions are separable from said transparent lamination sheet and joined at a location substantially aligned with a side edge of the identification card backing region, whereby the laminated identification card is formed by separating the identification card backing region and the identification card front and back covering portions from the assembly, folding the identification card front covering portion over the second side of the identification card backing region, and joining the identification card front covering portion to the identification card backing region with said adhesive layer.

2. The assembly according to claim 1, wherein the display card-forming section comprises:

a facing sheet having a first side a second backing sheet having opposed first and second sides wherein the second side is suitable for being printed on, and a second adhesive layer, wherein the first side of said facing sheet and the first side of said second backing sheet are adhered together by said second adhesive layer.

3. The assembly according to claim 2, wherein the display card-forming section further comprises:

a second release layer joined to the first side of said second backing sheet and to said second adhesive layer, whereby said second backing sheet and said facing sheet are releasably adhered together.

4. The assembly according to claim 2, wherein the display card-forming section is formed of a single sheet.

5. The assembly according to claim 2, wherein said first adhesive layer and said second adhesive layer are formed of a single adhesive layer.

6. The assembly according to claim 2, wherein said facing sheet is coplaner with said lamination sheet.

7. The assembly according to claim 5 wherein said second adhesive layer is located intermittently whereby said facing sheet and said first side of said second backing sheet are intermittently adhered together.

8. The assembly according to claim 1, wherein said first backing sheet contains die cuts to facilitate separation of said identification card backing region from said first backing sheet.

9. The assembly according to claim 8, wherein said lamination sheet contains die cuts to facilitate separation of said identification card back covering portion and said identification card front covering portion from said lamination sheet.

10. The assembly according to claim 9, wherein said lamination sheet contains perforations at said location substantially aligned with the side edge of said identification card backing region to facilitate folding.

11. A longitudinally extending assembly having a width and a length for printing by a laser or ink jet printer or photocopier, said assembly comprising:

a display card-forming section extending along the entire width and part of the length of said assembly;

an identification card-forming section attached to said display card-forming section and extending along the entire width and part of length of said assembly, wherein said identification card-forming section comprises:

a longitudinally extending backing sheet having a first side, a second side suitable for receiving printing, and an opening;

a card having an extent, said card substantially filling said opening; and a longitudinally extending substantially transparent plastic lamination sheet adhered to a first portion of said first side of said backing sheet, said lamination sheet having an extent approximately equal to at least twice the extent of said card, wherein said assembly has a substantially constant thickness across the entire width and length of the assembly to prevent jamming in the laser or ink jet printer or photocopier.

12. The assembly according to claim 11, wherein the display card-forming section comprises:

a longitudinally extending facing sheet adhered to a second portion of said first side of said backing sheet, wherein said facing sheet is coplanar with said lamination sheet.

13. The assembly according to claim 12, wherein said backing sheet has a release coating on only selected portions of said first side of said backing sheet.

14. The assembly according to claim 13, wherein said backing sheet has a release coating on said second portion of said backing sheet.

15. The assembly according to claim 14, wherein said backing sheet has a release coating on a portion of said first portion of said backing sheet.

16. The assembly according to claim 15, wherein said backing sheet has a void of release coating on said first portion of said backing sheet, wherein said void is coextensive with said card.

17. The assembly according to claim 12, wherein said lamination sheet has an extent greater than twice the extent of said card.

18. The assembly according to claim 17, wherein said lamination sheet includes a lamination strip, wherein the lamination strip is removably adhered to said first side of said backing sheet.

19. The assembly according to claim 12, wherein said facing sheet is adhered to said first side of said backing sheet by a coating of pressure sensitive adhesive.

20. The assembly according to claim 19, wherein said lamination sheet has a first side adhered to said backing sheet and said facing sheet has a first side adhered to said backing sheet and said pressure sensitive adhesive is located on said first side of said lamination sheet and said first side of said facing sheet.

21. The assembly according to claim 20, wherein said pressure sensitive adhesive is located only on portions of said first side of said lamination sheet and said first side of said facing sheet.

22. A method for creating a laminated card from a longitudinally extending assembly, wherein said method comprises:

providing a longitudinally extending assembly as defined in claim 1 for creating a display card and a laminated identification card which are suitable for printing on with a laser or ink jet printer, or photocopier;

separating the identification card backing region and the identification card front and back covering portions from the assembly;

folding the identification card front covering portion over the second side of the identification card backing region; and joining the identification card front covering portion to the identification card backing region with said adhesive layer.

23. The method according to claim 22, wherein said display card-forming section comprises:

a facing sheet having a first side a second backing sheet having opposed first and second sides wherein the second side is suitable for being printed on, and a second adhesive layer, wherein the first side of said second facing sheet and the first side of said second backing sheet are adhered together by said second adhesive layer.

24. The method according to claim 23, wherein said display card-forming section further comprises:

a second release layer joined to the first side of said second backing sheet and to said second adhesive layer, whereby said second backing sheet and said facing sheet are releasably adhered together.

25. The method according to claim 23, wherein the display card-forming section is formed of a single sheet.

26. The method according to claim 23, wherein said first adhesive layer and said second adhesive layer are formed of a single adhesive layer.

27. The method according to claim 23, wherein said facing sheet is coplaner with said lamination sheet.

28. The method according to claim 23, wherein said adhesive layer is located intermittently whereby said facing sheet and said first side of said second backing sheet are intermittently adhered together.

29. The method according to claim 23, wherein said first backing sheet contains die cuts to facilitate separation of said identification card backing region from said first backing sheet.

30. The method according to claim 29, wherein said lamination sheet contains die cuts of said identification card back covering portion and said identification card front covering portion from said lamination sheet.

31. The method according to claim 30, wherein said lamination sheet contains perforations at said location substantially aligned with the side edge of the identification card backing region to facilitate folding.

32. A method for creating a laminated card from an assembly comprising the steps of:

providing a longitudinally extending assembly as defined in claim 11 for printing by a laser or ink jet printer or copier;

removing the card and the lamination strip together from the assembly, the card being adhered on the side opposite to said printing surface to the lamination strip;

folding the lamination strip over to cover the printing surface of the card; and pressing the lamination strip and the entire card firmly together to seal the lamination strip over the card.

33. A method according to claim 32, wherein the lamination strip includes a line of perforations dividing the lamination strip into two halves, said folding further comprising:

folding the lamination strip over at the line of perforations to cover the printing surface of the card.

34. A method according to claim 33, wherein the card has edges and the lamination strip extends beyond the edges of the card, said pressing further comprising:

pressing the lamination strip about the edges of the card to seal the lamination strip about the edges of the card.

35. A method according to claim 32, wherein said backing sheet having a release coating has a void of release coating in an area which is coextensive with said card.

36. A method according to claim 32 further comprising:
printing onto the printing surface of said card prior to said removing.

37. A method according to claim 36, wherein a laser printer carries out said printing.

38. An assembly for creating a laminated identification printable sheet area for printing by a laser or inkjet printer or photocopier, the assembly comprising:
a backing sheet comprising a first side, a second side which has a printing surface, and an opening;
an identification printable sheet having an area substantially filling said opening and being removable positioned in said opening;
a substantially transparent plastic lamination sheet adhered to said first side of said backing sheet, said lamination sheet being substantially coextensive with said backing sheet;
said lamination sheet comprising a removable portion which releasably adheres to and covers one surface of said identification printable sheet area and which removably adheres to said backing sheet adjacent to said opening; and
said removable portion of said lamination sheet having an extent approximately equal to twice the extent of said identification printable sheet area;
wherein the assembly has a substantially constant thickness across said assembly so as to prevent jamming in a laser or inkjet printer or photocopier, and wherein said removable portion of said lamination sheet may be folded over to enclose said printable sheet area.

39. An assembly for creating laminated cards for printing by a laser or inkjet printer or photocopier, the assembly comprising:
a backing sheet comprising a first side, a second side which has a printing surface, and an opening;
a card, said card substantially filling said opening and being removably positioned in said opening;
a substantially transparent plastic lamination sheet adhered to said first side of said backing sheet, said lamination sheet being substantially coextensive with said backing sheet;
said lamination sheet comprising a removable portion which firmly adheres to and covers one surface of said card and which removably adheres to said backing sheet adjacent to said opening; and
said removable lamination portion having an extent approximately equal to twice the extent to said card;
wherein the assembly has a substantially constant thickness across the entire width and length of the assembly so as to prevent jamming in a laser or inkjet printer or photocopier.

40. An assembly as defined in claim 39, wherein said card/lamination set comprises a hanging file tab which has a left engagement toe and a right engagement toe when said lamination member is folded about its line of symmetry over its corresponding card, said engagement toes each having an inwardly extending slot.

41. An assembly as defined in claim 39, wherein said card/lamination set comprises an index tab, and said card is adhered to said removable portion of said lamination sheet entirely on one side of said line of symmetry.

42. An assembly as defined in claim 39, wherein said assembly further comprises a plurality of cards and corresponding removable portions of said lamination sheet.

43. An assembly as defined in claim 42, wherein said assembly further comprises at least one line of weakness that weakens both said lamination sheet and said backing sheet and which separates said assembly into sections, each of said sections comprising at least one removable portion of said lamination sheet and at least one card.

44. An assembly as defined in claim 42, wherein said assembly is approximately 4.5 inches wide by 11 inches long and is divided symmetrically in its lengthwise direction into two sections by a line of microperforations which extend across the width of the assembly, said line of microperforations also extending through both said sheet of lamination and said backing sheet.

45. An assembly as defined in claim 39 wherein said backing sheet further includes a release coating over the entire width and length of the backing sheet.

46. An assembly as defined in claim 39, wherein said assembly is no more than 15 mils thick.

47. An assembly as defined in claim 39, wherein said assembly is less than approximately 5 inches wide.

48. An assembly for creating laminated cards for printing by an office printing machine, the assembly comprising:
a backing sheet comprising a first side, a second side which has a printing surface, and an opening;
a card, said card substantially filling said opening and being removably positioned in said opening;
a substantially transparent plastic lamination sheet adhered to said first side of said backing sheet, said lamination sheet juxtaposed with said backing sheet over an extended area extending well beyond said card in all directions;
said transparent plastic lamination sheet comprising a removable portion which has die cut edges between said lamination portion and the remainder of said lamination sheet, and said lamination portion firmly adheres to and covers one surface of said card and which removably adheres to said backing sheet adjacent to said opening; and
said removable lamination portion having an extent approximately equal to twice the extent of said card;
whereby said card may be pushed through said lamination sheet secured to and carrying said lamination portion, and the remainder of said lamination portion may than be folded over said card to seal said card on both sides by said lamination portion.

49. The assembly according to claim 1, wherein the laminated identification card is formed by separating the identification card backing region and the identification card front and back covering portions from the assembly, folding the identification card front covering portion over the second side of the identification card backing region, and joining the identification card front covering portion directly to the identification card backing region with said adhesive layer.

50. The assembly according to claim 11, wherein the laminated identification card is formed by separating the identification card backing region and the identification card front and back covering portions from the assembly, folding the identification card front covering portion over the second side of the identification card backing region, and joining the identification card front covering portion directly to the identification card backing region with said adhesive layer.

* * * * *